(12) United States Patent
Elangovan et al.

(10) Patent No.: US 8,012,380 B2
(45) Date of Patent: Sep. 6, 2011

(54) PROTON CONDUCTING CERAMIC MEMBRANES FOR HYDROGEN SEPARATION

(75) Inventors: S. Elangovan, South Jordan, UT (US); Balakrishnan G. Nair, Sandy, UT (US); Troy Small, Midvale, UT (US); Brian Heck, Salt Lake City, UT (US)

(73) Assignee: Ceramatec, Inc., Salt Lake City, UT (US)

( * ) Notice: Subject to any disclaimer, the term of this patent is extended or adjusted under 35 U.S.C. 154(b) by 469 days.

(21) Appl. No.: 11/835,823

(22) Filed: Aug. 8, 2007

(65) Prior Publication Data

US 2008/0032140 A1 Feb. 7, 2008

Related U.S. Application Data

(63) Continuation-in-part of application No. 10/708,475, filed on Mar. 5, 2004, now Pat. No. 7,258,820.

(51) Int. Cl.
*H01B 1/08* (2006.01)

(52) U.S. Cl. ............... 252/518.1; 252/521.1; 252/520.5; 95/55

(58) Field of Classification Search .................. 252/500, 252/518.1, 521.1, 520.5; 423/593.1; 95/45, 95/55
See application file for complete search history.

(56) References Cited

U.S. PATENT DOCUMENTS

| | | | |
|---|---|---|---|
| 4,879,016 A | 11/1989 | Joshi | |
| 5,021,137 A | 6/1991 | Joshi et al. | |
| 5,378,345 A | 1/1995 | Taylor et al. | |
| 5,387,330 A | 2/1995 | Taniguchi et al. | |
| 5,478,444 A | 12/1995 | Liu et al. | |
| 5,616,223 A | 4/1997 | Shen et al. | |
| 5,652,020 A | 7/1997 | Collins et al. | |
| 5,670,270 A * | 9/1997 | Wallin | 429/33 |
| 5,868,918 A | 2/1999 | Adler et al. | |
| 6,066,592 A | 5/2000 | Kawae et al. | |
| 6,187,157 B1 | 2/2001 | Chen et al. | |
| 6,235,417 B1 | 5/2001 | Wachsman et al. | |
| 6,296,687 B2 | 10/2001 | Wachsman et al. | |

(Continued)

FOREIGN PATENT DOCUMENTS

EP 0438902 7/1991
(Continued)

OTHER PUBLICATIONS

Kuenstler et al "Physical-chemical investigations on Gd-, Eu- and In-doped BaCeO3 ceramics", High Temperature Electrochemistry: Ceramics and Metals, Proceedings of the Risoe International Symposium on Materials Science, 17th, Roskilde, Den., Sep. 2-6, 1996, 325-330. (abstract).*

(Continued)

*Primary Examiner* — Mark Kopec
(74) *Attorney, Agent, or Firm* — David Fonda

(57) ABSTRACT

A multi-phase proton conducting material comprising a proton-conducting ceramic phase and a stabilizing ceramic phase. Under the presence of a partial pressure gradient of hydrogen across the membrane or under the influence of an electrical potential, a membrane fabricated with this material selectively transports hydrogen ions through the proton conducting phase, which results in ultrahigh purity hydrogen permeation through the membrane. The stabilizing ceramic phase may be substantially structurally and chemically identical to at least one product of a reaction between the proton conducting phase and at least one expected gas under operating conditions of a membrane fabricated using the material. In a barium cerate-based proton conducting membrane, one stabilizing phase is ceria.

31 Claims, 9 Drawing Sheets

U.S. PATENT DOCUMENTS

| | | | |
|---|---|---|---|
| 6,332,964 | B1 | 12/2001 | Chen et al. |
| 6,569,226 | B1 | 5/2003 | Dorris et al. |
| 7,001,446 | B2 | 2/2006 | Roark et al. |
| 7,258,820 | B2* | 8/2007 | Elangovan et al. ........ 252/518.1 |
| 7,588,626 | B2* | 9/2009 | Gopalan et al. .................. 95/45 |
| 2005/0194571 | A1* | 9/2005 | Elangovan et al. ........... 252/500 |

FOREIGN PATENT DOCUMENTS

| | | |
|---|---|---|
| EP | 0523696 | 1/1993 |
| EP | 1598325 | 11/2005 |
| WO | WO-03/037490 | 5/2003 |

OTHER PUBLICATIONS

Balachandran et al "Development of mixed-conducting oxides for gas seraration" Solid State Ionics 108(1998) 363-370.*

Haile et al "Non-stoichiometry, grain boundary transport and chemical stability of proton conducting perovskites", Journal of Material Science 36 (2000) 1149-60.*

Balachandran, et al., "Development of mixed-conducting oxides for gas separation", *Solid State Ionics* 108, (1998), 363-370.

Guan, et al., "Development of Mixed-Conducting Ceramic Membranes", *Ceramic Transactions* 92 1-12 (1998), Paper submitted for presentation at the 100th Annual Meeting and Exposition of the American Ceramic Society, Cincinnati, Ohio, May 3-6, 1998, (May 3, 1998), 1-12.

Küenstler, et al., "Physical-chemical investigations on Gd-, Eu- and In-doped $BaCeO_3$ ceramics", *High Temperature Electrochemistry: Ceramics and Metals, Proceedings of the Risoe International Symposium on Materials Science, 17th, Roskilde, Den.*, (1996), 325-330.

Sharova, et al., "Electroconductivity and Ion Transport in Protonic Solid Electrolytes $BaCe_{0.85}R_{0.15}O_{3-\delta}$, where R is a Rare-Earth Element", *Russian Journal of Electrochemistry (Translation of Elektrokhimiya)*, (2003), 461-466.

Siriwardane, et al., "Characterization of ceramic hydrogen separation membranes with varying nickel concentrations", *Applied Surface Science* 167 [1] 34-50 (2000), (May 14, 2000), 34-50.

KOPEC, International Search Report for PCT/US05/07124 sent Jul. 21, 2006, 1-3.

KOPEC, Written Opinion for PCT/US05/07124 sent Jul. 21, 2006, 1-5.

KOPEC, Office Action for U.S. Appl. No. 10/708,465 sent Jan. 8, 2007, 1-12.

KOPEC, Office Action for U.S. Appl. No. 10/708,745 sent Jun. 27, 2006, 1-12.

Marti, Pedro "European Search Report", European Search Report for App. No. EP 05724631 Sent on Oct. 30, 2008, 1-5.

Norby, et al., "Mixed Hydrogen Ion-Electronic Conductors for Hydrogen Permeable Membranes", *Solid State Ionics* 136-137, (2000),139-148.

Copenheaver, Blaine "International Search Report", International Application No. PCT/US08/09464, (Nov. 12, 2008),1-2.

Copenheaver, Blaine "Written Opinion of the International Searching Authority", International Application No. PCT/US08/09464, (Nov. 12, 2008),1-4.

Marti, Pedro "Communication Pursuant to Article 94(3) EPC", European Application No. 05725632.4, (Sep. 14, 2009),1-4.

* cited by examiner

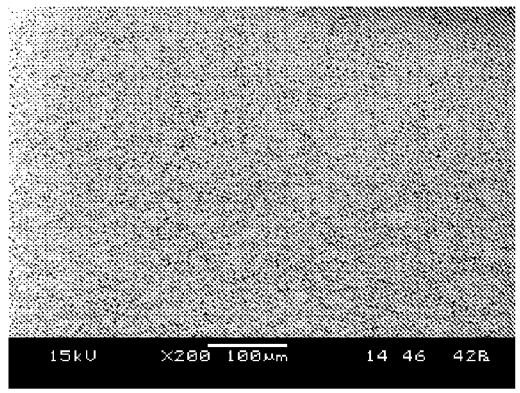
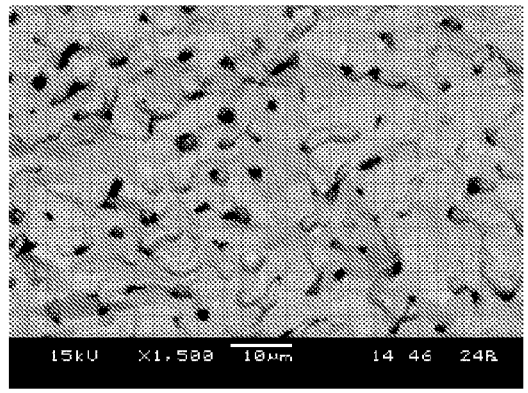
Fig. 9A
Fig. 9B
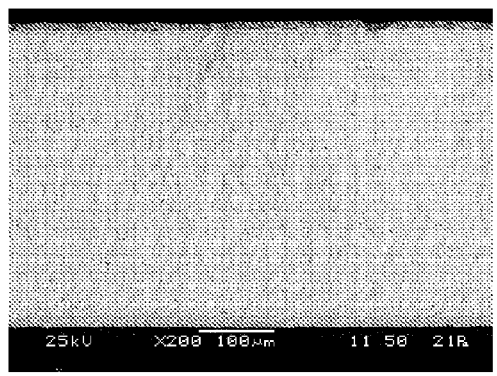
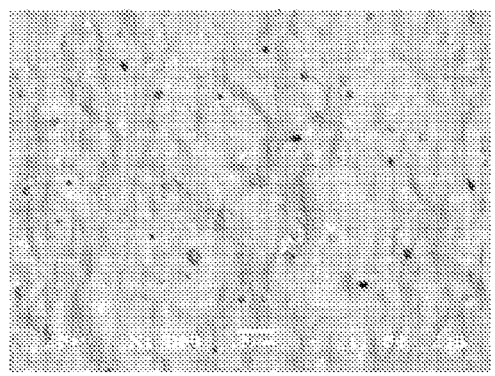
Fig. 10A
Fig. 10B

PROTON CONDUCTING CERAMIC MEMBRANES FOR HYDROGEN SEPARATION

CROSS-REFERENCE TO RELATED APPLICATION

This is a continuation-in-part of application Ser. No. 10/708,475, filed Mar. 5, 2004, U.S. Pat. No. 7,258,820, which is incorporated by reference.

GOVERNMENT RIGHTS

This invention was made in part with government support under Grant No.: DE-PS02-07ER07-17 awarded by the United States Department of Energy. The Government has certain rights in the invention.

BACKGROUND OF THE INVENTION

This invention relates to a hydrogen conducting ceramic membrane having improved stability in mixed gases of the type encountered in fuel cell operation. The invention further relates to ceramic membrane materials having improved sinterability and density.

A variety of metallic, ceramic and polymer membranes have been used for $H_2$ separation from gas streams. The most common metallic membrane materials are palladium (Pd) and palladium alloys (see, for example, U.S. Pat. Nos. 6,066,592 and 5,652,020). However, these materials are unsuitable for $H_2$ separation from raw syngas due to the fact that they are poisoned by hydrocarbons at concentrations as low as 0.5 parts per million (ppm). Further, oxygen concentrations higher than 50 ppm can lead to the catalytic oxidation of hydrogen to water in the presence of Pd, resulting in localized hot spots and premature failure of these membranes. A number of organic membranes (e.g. Nafion) have also been identified as protonic conductors, but these are for lower temperature applications (less than 150° C.) and even at those temperatures are severely degraded by CO gas.

In recent years ceramic membranes have been investigated for use in purifying hydrogen gas from gas streams such as syngas. For example, U.S. Pat. No. 5,387,330 by Taniguchi et al. has shown that perovskite type oxides such as $BaCe_{1-x}M_xO_3$, where M is a metal dopant, have high proton conductivity at elevated temperatures. Although these compounds are mixed ionic/electronic conductors, their electronic conductivity is so low relative to the ionic conductivity that they have not been useful in pressure driven type membrane devices.

More recently, Wachsman et al., in U.S. Pat. Nos. 6,235,417 and 6,296,687, claim that with appropriate substitutions in the perovskite $BaCe_{1-x}M_xO_3$ on the "M" site the electronic conductivity could be enhanced appreciably. By substitution of the proper multivalent transition metal and lanthanide cations the electronic conductivity improved to the point where hydrogen fluxes through the mixed conducting membrane were comparable to the $O_2$ flux achieved through the analogous mixed conducting oxygen ion membranes based on $La_{1-y}Sr_yCo_{1-x}M_xO_3$. Wachsman et al., however, has not resulted in an economically feasible process for purifying hydrogen from gas streams. Other problems remain that have prevented commercialization, namely, the hydrogen flux rates are still not sufficient to produce a commercially viable device and the membranes have not been shown to have adequate thermochemical stability in the syngas environment.

While alternate dopants have resulted in an increase in the electronic conductivity, the increase in electronic conductivity is insufficient for the membrane to function effectively as a pressure-driven hydrogen separation membrane. Alternatively, if a two-phase composite can be fabricated wherein an electronically conducting phase and a protonic conducting phase form interpenetrating networks within a dense ceramic, it may be possible to independently control the fluxes of protons and electrons. Argonne National Laboratory (ANL) is developing dense ceramic/metal composites to fabricate mixed conducting membranes for hydrogen separation. [J. Guan et al., "Development of Mixed-Conducting Ceramic Membranes for Hydrogen Separation," *Ceramic Transactions* 92 1-12 (1998) and R. V. Siriwardane et al. "Characterization of Ceramic Hydrogen Separation Membranes with Varying Nickel Concentrations," *Applied Surface Science* 167 [1] 34-50 (2000)]. The ANL group has reported hydrogen fluxes as high as 15 $cc/cm^2$/min when the metallic phase is also a hydrogen conductor, i.e. palladium. However, Pd-based cermets are not good options for $H_2$ separation from syngas as Pd is significantly poisoned by hydrocarbons at high temperature. With a non-hydrogen conducting protonic phase, the best fluxes published by the ANL group is below 1 $cc/cm^2$/min. Further, the selection of an appropriate metallic second phase with thermochemical and thermomechanical stability is also a concern. Most metals are embrittled by $H_2$ or corroded by the trace components in syngas at elevated temperatures. Relatively inert metals such as platinum and gold have thermal compatibility issues with the protonic conducting phase due to thermal expansion mismatch. In addition, metals are generally soft at the elevated temperatures, which make the puncturing of very thin membranes of the order of 20 µm very likely. Therefore, while the use of cermets for pressure-driven $H_2$ separation remains an interesting possibility, further technological advances are required to make it a viable technology.

SUMMARY OF THE INVENTION

The present invention is a two-phase all-ceramic composite membrane for pressure and electrical driven hydrogen separation from syngas or other mixtures of hydrogen and secondary gases. One of the phases is a proton-conducting ceramic phase and the second phase is stabilizing ceramic phase. The all-ceramic membrane offers significant advantages in thermomechanical and thermochemical stability over competing membrane technologies such as known proton-conducting ceramic materials and ceramic/metal composites.

According to a particular aspect, a proton conducting ceramic membrane is provided that is chemically and mechanically stable in the high temperature reducing environment typical of syngas or similar fossil fuel generated gas stream from which a high purity hydrogen gas can be separated.

According to yet another aspect, a perovskite type compound is stabilized in high temperature environments containing $CO_2$ and $H_2O$ by addition of cerium oxide based compounds in the ceramic composite which functions to shift the equilibrium reactions of the chemical constituents present towards the reactant side of the equilibrium reaction thereby maintaining the perovskite composition.

According to yet another aspect, the chemical composition of a perovskite phase is modified by removing some of the barium (or strontium) resulting in a non-stoichiometric perovskite phase thereby minimizing the chemical reaction between barium (or strontium) and $CO_2$ which is a common problem observed with barium cerate and strontium cerate in syngas type environments.

BRIEF DESCRIPTION OF THE DRAWINGS

FIGS. 9A and 9B are SEM Micrographs of sintered single phase perovskite showing closed porosity at 200× and 1500×, respectively;

FIGS. 10A and 10B are SEM Micrographs of sintered perovskite composite material with 10 vol. % ceria at 200× and 1000×, respectively;

DETAILED DESCRIPTION OF THE EMBODIMENTS

Figure 1:
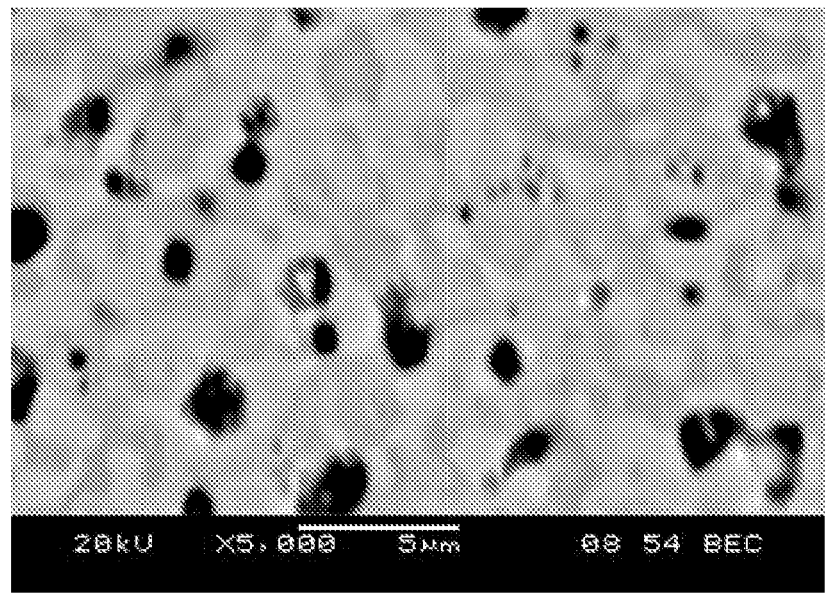
FIG. 1 is a SEM Micrograph showing two-phase composite of a proton-conducting perovskite phase.

While this invention is capable of embodiment in many different forms, there is shown in the drawings and will herein be described in detail, several specific embodiments with the understanding that the present disclosure is to be considered as an exemplification of the principles of the invention and is not intended to limit the invention to the embodiments so illustrated.

The basic features that are required to achieve a stable proton conducting membrane material are a proton conducting ceramic phase and a stabilizing ceramic phase. Other ceramic phases may be added as required to improve protonic conductivity or chemical stability.

The proton conducting ceramic phase could be a doped perovskite of the general composition $A_{1-x-\alpha}P_xB_{1-y}Q_yO_{3-\delta}$. A is a bivalent cation such as barium (Ba), strontium (Sr), calcium (Ca) or magnesium (Mg) and combinations thereof, P is an A-site dopant, which may be a cation such as Pr, Sm, Er or other cations belonging to the lanthanide series. B is a tetravalent cation which may be either an element in Group IV of the period table (e.g. Ti, Zr) or an element in the lanthanide series of the periodic table (e.g. Ce, La). Q is a B-site dopant which may be either an element in Group III of the period table (e.g. Sc, Y) or another element (other than B) in the lanthanide series of the periodic table (e.g. Eu, Nd, Gd, Yb). $\alpha$ represents the A-site non-stoichiometry (deficiency), and $\delta$ is an oxygen deficiency. In one embodiment, $\alpha$ ranges from about 0 to about 0.1 and $\delta$ ranges from about 0 to about 0.3. Some embodiments of the invention would include compounds with specific combination of elements on the A and B sites represented by the chemical formulas $Ba_{1-x-\epsilon}P_xCe_{1-y}Q_yO_{3-\delta}$, $Sr_{1-x-\epsilon}P_xCe_{1-y}Q_yO_{3-\delta}$, and $Ca_{1-x-\epsilon}P_xTi_{1-y}Q_yO_{3-\delta}$. Other embodiments would include an A-site deficiency $\epsilon$, where $0 \leq \alpha \leq 0.1$ and where $0 \leq \epsilon \leq 0.3$. It is to be specifically noted here that P and Q may represent more than one element of the type specified above, and addition of more than one dopant at the A and B site fall within the scope of this invention.

In another embodiment of the present invention, the proton conducting ceramic phase may be a complex perovskite. The complex perovskite could be of the types $A_2(B'_{1+\beta}B''_{1-\beta})O_{6-\lambda}$ or $A_3(B'_{1+\phi}B''_{2-\phi})O_{9-\lambda}$, in which A ions are always bivalent (e.g. Ba, Sr, Ca, La), B' ions are trivalent (Eg. Y, Ga, Sc, In, Yb, Nd) or tetravalent (e.g. Zr, Ti, Ce), and B" ions are pentavalent (e.g. Bi, Nb). Generally, $0 \leq \beta \leq 0.2$ and $0 \leq \phi \leq 0.2$. $\lambda$ may range from about 0 to about 0.2.

In yet another embodiment of the present invention, the proton conducting ceramic phase could be a pyrochlore structure $(A'_{2-\gamma}A''_{\gamma})_2(B_{2-\eta}R_\eta)O_{7-\lambda}$ where A' is a bivalent cation (e.g. La), A" is another bivalent cation, B is a tetravalent cation (e.g. Zr, Ce) and R is a bivalent cation (e.g. Ca). In one embodiment, A" and R would be the same cation. Generally, $0 \leq \gamma \leq 0.3$ and $0 \leq \eta \leq 0.3$.

In one embodiment of the present invention, the stabilizing ceramic phase will also be a product of the reaction between a corrosive gas species and the protonically conducting phase. For example when $CO_2$ or $H_2O$ react with Ba or Sr-containing perovskites, one of the byproducts is cerium oxide ($CeO_2$). As disclosed in copending application Ser. No. 10/708,475, doped $CeO_2$ is a good electronic conductor under reducing environment. The incorporation of doped $CeO_2$ above the percolation limit results in sufficient electronic conductivity to make the material an excellent mixed conductor. However, because electronic conductivity is detrimental to fuel cell electrolyte function, the stabilizing phase, if electrically conductive, is present in an amount below the percolation limit. Incorporation of ceria, doped or undoped, will improve the thermodynamic stability of the composite material in the presence of $CO_2$ or $H_2O$ over perovskite materials where no $CeO_2$ is added. If the perovskite phase is doped, it may be beneficial to have the ceria be doped with same dopant used in the perovskite phase.

The principles of the present invention are demonstrated by the following examples of fabricating the proton conducting ceramic composite material. These examples are given to illustrate various embodiments within the scope of the present invention. The examples are given by way of example only, and it is to be understood that the following examples are not comprehensive or exhaustive of the many embodiments within the scope of the present invention.

EXAMPLE 1

A stoichiometric perovskite material was prepared by adding raw material oxide and carbonate powders ($BaCO_3$, $CeO_2$, $Eu_2O_3$) in stoichiometric amounts to form the perovskite $BaCe_{0.8}Eu_{0.2}O_{2.9}$. The powders were mixed for 30 minutes on a paint shaker with zirconia milling media in a 1 liter Nalgene bottle followed by ball milling for 24 hours. The well mixed powder was then calcined at 1400° C. to decompose the carbonate and react the powders together to form a single phase perovskite material. The calcined powder was then ball milled for 72 hrs in acetone resulting in a fine powder with a 1-2 micron particle size with a surface area from 1.5-3 $m^2/g$.

The powder was screened through an 80 mesh sieve and then mixed with europium doped ceria that was fabricated by a similar process as the $BaCe_{0.8}Eu_{0.2}O_{2.9}$ to form a 50/50 volume % mixture. The two powders were placed in a Nalgene container with milling media and acetone and then mixed vigorously on a paint shaker for 30 minutes. This mixture was then dried for 12 hours and then screened through an 80 mesh sieve to ensure that the individual powders were well mixed and that there were no large agglomerates from the milling and drying steps. The screened mixture of powders is then placed in a drying oven at 80-90° C. for 24 hours to ensure that the powder is dry.

The dry powder was then ready for fabrication into a ceramic membrane using a variety of ceramic processing techniques such as tape casting, dry pressing or slip casting. In this example the powder was mixed with a 2 wt. % polyvinyl butyral (PVB) binder solution and acetone and mixed again with milling media on a paint shaker. After mixing the slurry was dried and the binder/powder was then used to fill a 1 inch pellet die followed by dry pressing at 10,000 psi and finally isostatically pressing the pellet at 25,000 psi. The pressed pellet was then sintered at 1550° C. for 2 hours. The sintered pellet was then analyzed by XRD to verify the formation of the two desired phases. It was found that the barium cerate and doped ceria were indeed the two phases present. Finally, the sample was prepared for SEM analysis. FIG. 1 shows the microstructure of the sintered two-phase composite material. More specifically, FIG. 1 is a backscattered SEM micrograph of two-phase composite of a perovskite (grey phase) and doped ceria (bright phase). The pores in the structure, the very dark areas, are completely closed and do not allow gas flow across the membrane.

EXAMPLE 2

Figure 2:
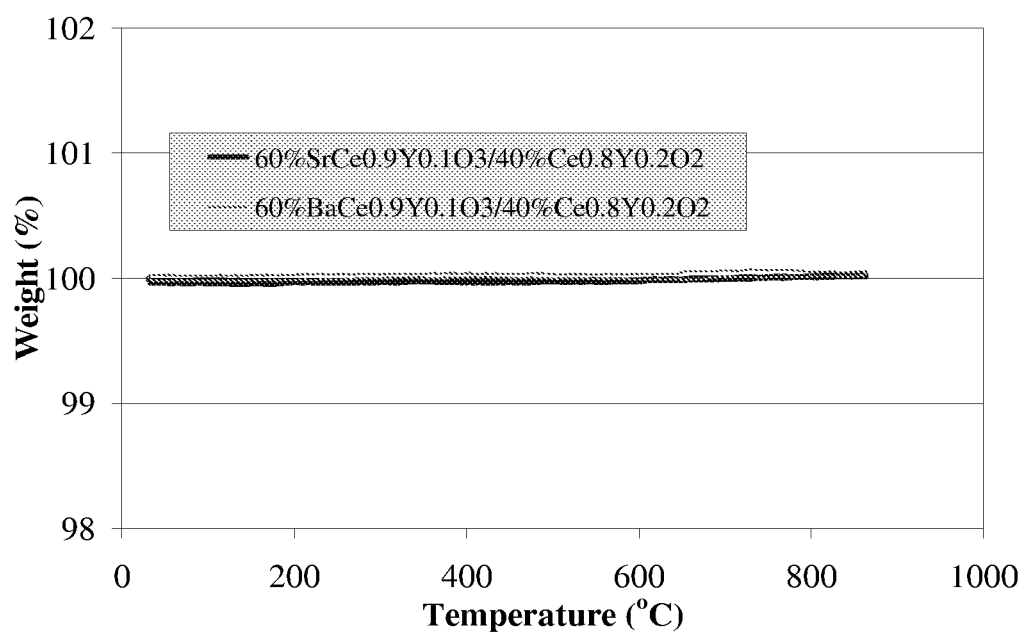
FIG. 2 is a graph of a thermogravimetric analysis in syngas environments showing no weight gain of two phase composite material in syngas.

Two different compositions of the two-phase proton conducting ceramic material were fabricated as described in Example 1. The two compositions formulated were (1) 50 vol. % $BaCe_{0.7}Eu_{0.3}O_{2.85}$+50 vol. % $Ce_{0.8}Y_{0.2}O_{2.9}$ and (2) 50 vol. % $BaCe_{0.8}Eu_{0.2}O_{2.9}$+50 vol. % $Ce_{0.8}Y_{0.2}O_{2.9}$. In order to demonstrate the stability of the two phase composite material, thermogravimetric analysis (TGA) in reducing environments containing $H_2O$ and $CO_2$ was performed to observe any weight changes as a function of time. There was no measurable weight change during the TGA tests as shown in FIG. 2 indicating that the material was stable at these temperature and gas composition environments. FIG. 2 depicts thermogravimetric analysis data in syngas showing very good stability of perovskite/oxide composites in reducing environments containing CO, $CO_2$ and $H_2O$.

EXAMPLE 3

A non-stoichiometric perovskite material was prepared by adding raw material oxide and carbonate powders ($BaCO_3$, $CeO_2$, $Eu_2O_3$) in non-stoichiometric amounts (barium deficient) to form the perovskite $Ba_{0.92}Ce_{0.8}Eu_{0.2}O_{2.82}$. The powders were mixed for 30 minutes on a paint shaker with zirconia milling media in a 1 liter Nalgene bottle followed by ball milling for 24 hours. The well mixed powder was then calcined at 1400° C. to decompose the carbonate and react the powders together to form a single phase perovskite material. The calcined powder was then ball milled for 72 hrs in acetone resulting in a fine powder with a 1-2 micron particle size with a surface area from 1.5-3 $m^2/g$.

Figure 3:
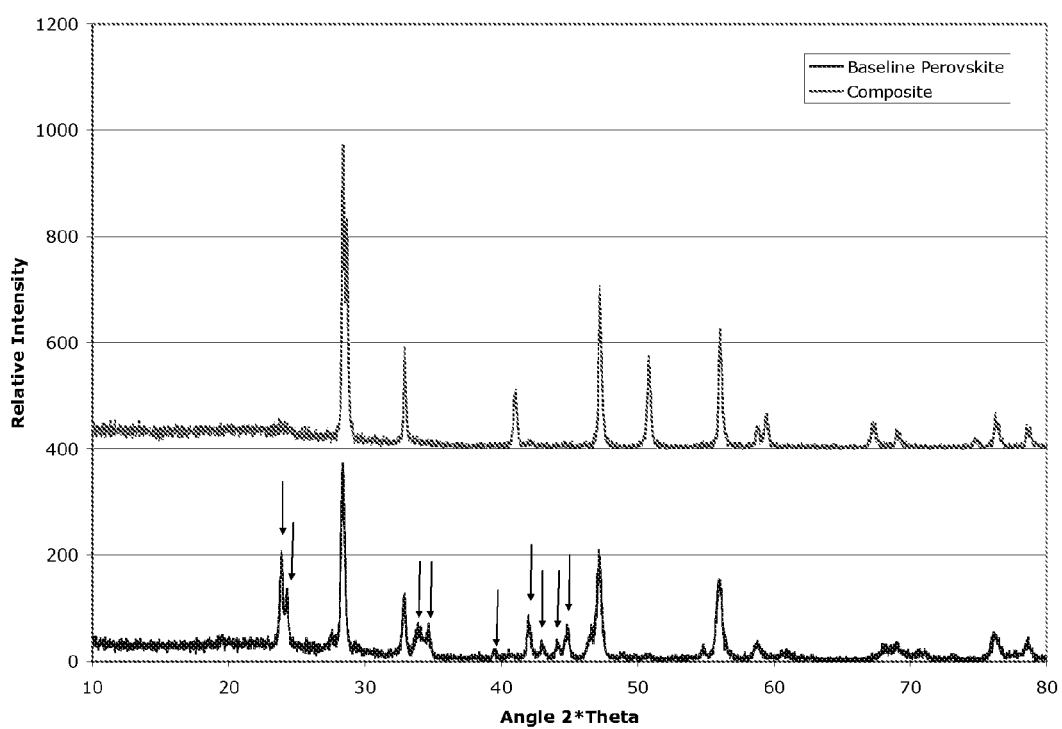
FIG. 3 is a graph of an X-ray analysis showing no significant carbonate formation in the new composite material.

It is well known that conventional doped barium cerate compositions are unstable in oxidizing conditions in the presence of $CO_2$ and $H_2O$ due to hydroxide and carbonate formation respectively. An experiment was performed to demonstrate that the materials in the present invention are more stable than perovskite materials alone that are commonly used as proton conducting membranes. In this experiment X-ray diffraction studies were performed on powder exposed to simulated syngas at high-temperature. The high-temperature exposure tests in simulated syngas showed no noticeable carbonate formation occurring in non-stoichiometric composite samples while baseline perovskite samples that were also non-stoichiometric were completely reacted as shown in FIG. 3. FIG. 3 depicts X-ray diffraction analysis data for powders exposed to syngas at 900° C. showing very little carbonate formation in the non-stoichiometric perovskite/oxide composite compared with the baseline non-stoichiometric perovskite exposed to identical conditions. The arrows in FIG. 3 indicate locations of the primary barium carbonate peaks in the baseline perovskite.

EXAMPLE 4

Figure 4:
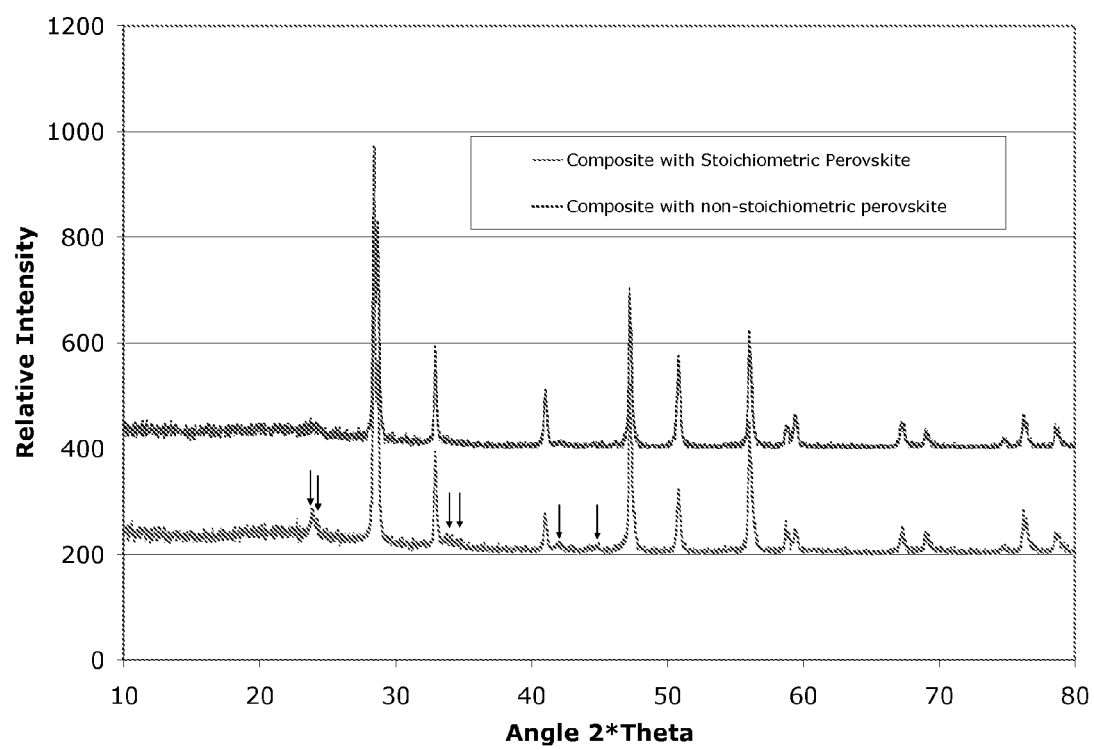
FIG. 4 is a graph of an X-ray analysis showing stability of non-stoichiometric composite material versus non-stoichiometric single phase perovskite in syngas at 900° C.

A stoichiometric perovskite/doped ceria composite was fabricated as described in Example 1 and a non-stoichiometric perovskite/doped ceria composite material was prepared as described in Example 3. These two sample materials were used to compare the stability of the two materials in a syngas environment at 900° C. FIG. 4 shows a comparison of x-ray diffraction pattern of composite powders with stoichiometric and non-stoichiometric perovskite phases. More specifically, FIG. 4 shows X-ray diffraction analysis data for powders exposed to syngas at 900° C. showing very little carbonate formation in the non-stoichiometric perovskite/oxide composite powder compared with the stoichiometric perovskite/oxide composite powder exposed to identical conditions. The arrows in FIG. 4 indicate locations of the primary barium carbonate peaks in the composite with stoichiometric perovskite. The composite with the non-stoichiometric A-site deficient perovskite had 50% by volume of $Ba_{0.92}Ce_{0.8}Eu_{0.2}O_{2.82}$ and 50% by volume of $Ce_{0.8}Eu_{0.2}O_{2.9}$, and the composite with the stoichiometric perovskite composition had 50% by volume of $BaCe_{0.8}Eu_{0.2}O_{2.9}$ and 50% by volume of $Ce_{0.8}Eu_{0.2}O_{2.9}$. The composite with the barium deficient composition shows improved chemical stability in syngas due to significantly lower carbonate formation, due to the lower activity of the A-site cations (i.e., $Ba^{2+}$ ions in the example given) in the non-stoichiometric composition.

EXAMPLE 5

Two phase composite ceramic powders were prepared as described in Example 1. These powders were then used to prepare slips for tape casting in order to fabricate a thin membrane mixed conductor that is supported on a porous substrate. The slip for the dense component was cast into 2 thicknesses, 8 mil and 1 mil, while the porous slip is only cast at 8 mil. The tape casts are dried using standard ceramic processing procedures and shapes are punched out of the separate tapes to shapes and sizes that are predetermined to maximize the exposed surface area of the thin layer of the membrane in the membrane package. Once the initial dimensions of the membrane were punched out the pieces were cut using a laser cutter to obtain the necessary features to maximize the surface area of the membrane and to also give the membrane support. Once laser cutting was finished the pieces were then laminated together using standard ceramic processing procedures to form the membrane package with substrate and membrane support.

After the membrane package was laminated it was fired to 1550° C. to burn out the pore former from the porous layer of the membrane package and to sinter the laminated layers into a continuous single structure that consisted of both the perovskite and the ceria doped with europium.

The sintered membrane package was then sealed into a stainless steel cup with a glass or cement that has a similar coefficient of thermal expansion to that of the composite perovskite and stainless steel. The stainless steel cup was designed and machined to support the membrane package and allow for a sweep gas on the permeate side of the membrane.

The testing apparatus was setup in a reforming catalyst reactor to accommodate various molar fractions in the syngas due to changing the volumetric feeds of hydrogen, methane, water, carbon dioxide, and carbon monoxide. The membrane that was sealed to the stainless steel cup was placed downstream of the catalyst in the reactor and heated to a temperature of 900° C. Helium was used as a sweep gas on the permeate side of the membrane to carry away the hydrogen to a zirconia oxygen sensor to determine the amount of hydrogen flux obtained. The zirconia oxygen sensor was calibrated by varying the concentrations of hydrogen and helium and measuring the voltage across the cell due to the different concentrations of hydrogen in the stream. While the test was running with syngas the voltage of the zirconia oxygen sensor was recorded and then used to determine the concentration of hydrogen in the carrier gas. This information was then used to calculate the flux through the membrane.

Figure 5:
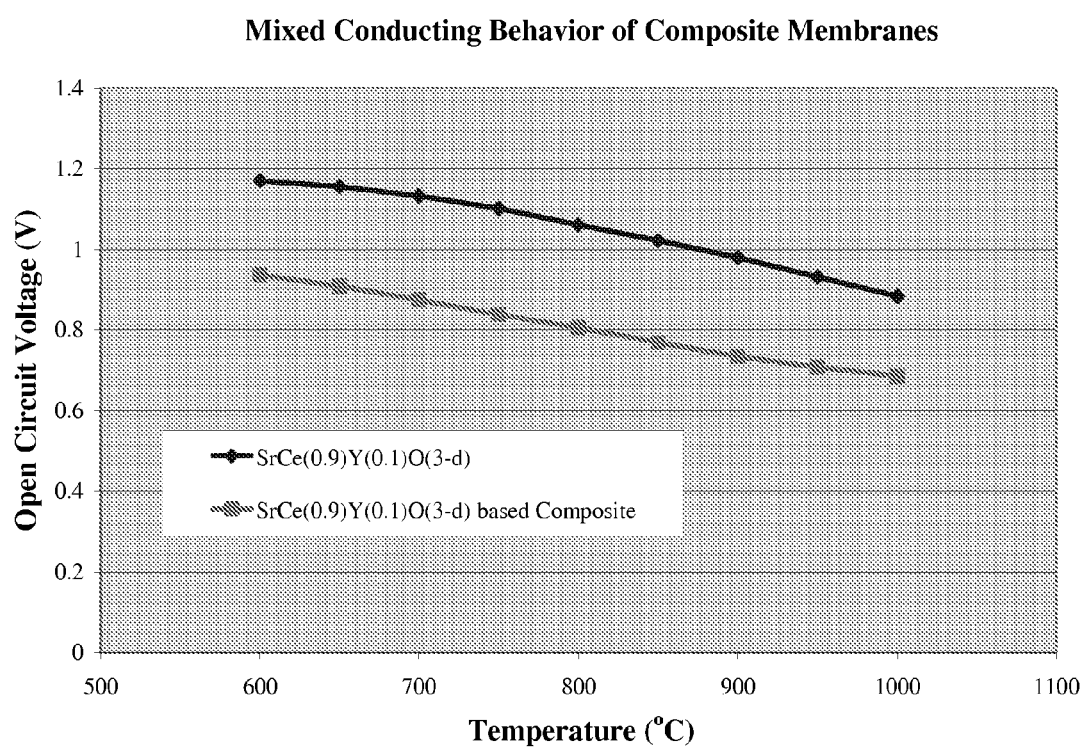
FIG. 5 is a graph of open circuit voltage measurements showing mixed conducting behavior of composite membranes.
Figure 6:
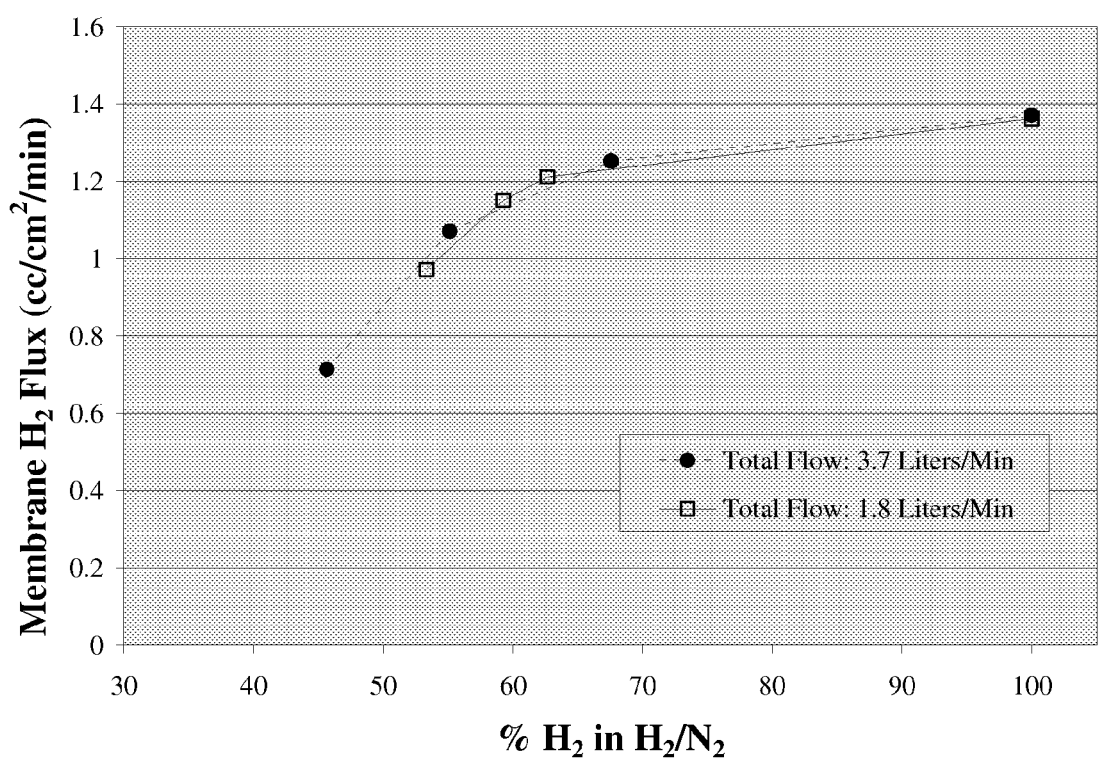
FIG. 6 is a graph demonstrating hydrogen separation driven by a hydrogen partial pressure gradient through a composite membrane.

FIG. 5 shows the open circuit voltage (OCV) across the composite membrane. More specifically, FIG. 5 shows the lowering of open circuit voltage in a perovskite/doped-ceria composite showing mixed ionic-electronic conducting behavior. In order to demonstrate the feasibility of pressure-driven hydrogen separation from syngas using the new composite materials, partial pressure/concentration driven $H_2$ separation experiments were performed using hydrogen/nitrogen mixtures. The experiments were performed using thick membranes (500 μm thickness). FIG. 6 shows the hydrogen flux obtained through a 500 μm thick dense perovskite/oxide composite membrane tested at two feed gas flow-rates to demonstrate that there were no leaks in the system. While the flux obtained (shown in FIG. 6) is relatively low (<1.4 cc/cm$^2$/min) due to the very thick (500 μm) membranes used, the experiment demonstrated that concentration/pressure driven hydrogen separation is feasible through these dense perovskite/oxide composite membranes.

EXAMPLE 6

Figure 7:
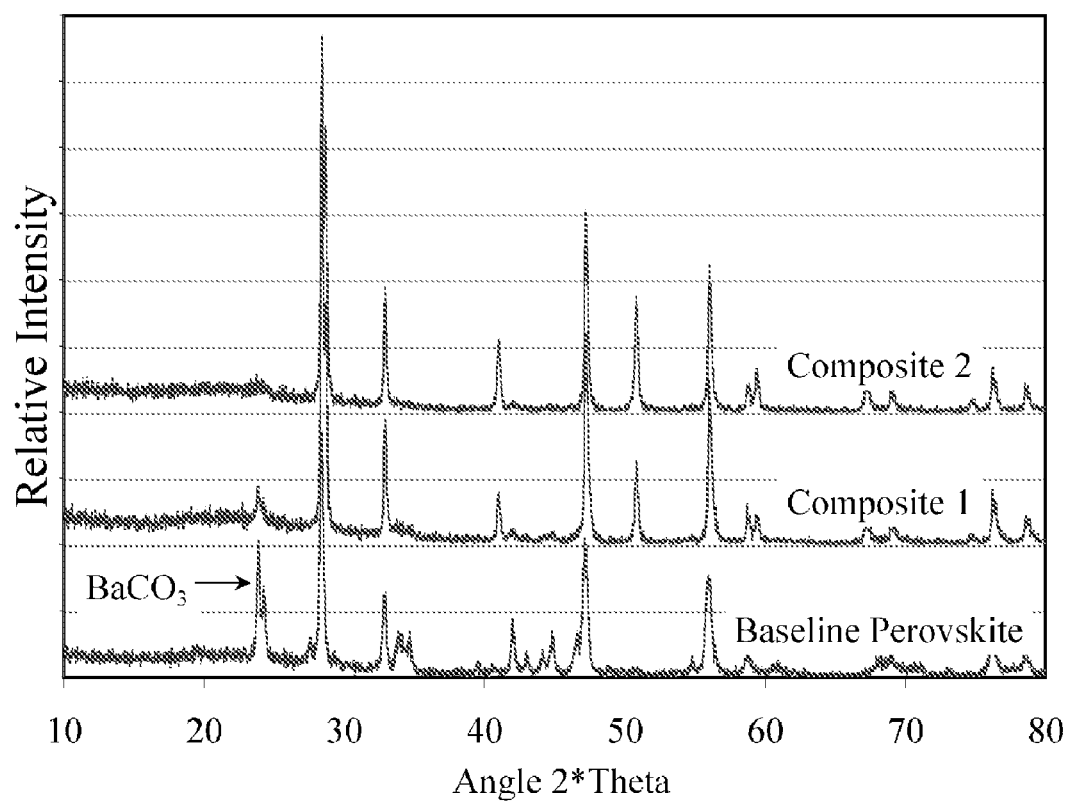
FIG. 7 is a graph of an X-ray analysis showing stability of syngas exposed stoichiometric and non-stoichiometric composite perovskite materials versus a single phase perovskite.

Stability of perovskite compositions in fuel conditions, in particular the reaction products $CO_2$ and $H_2O$ of fuel cell operation, is a major hurdle in the proton-SOFC development. From the foregoing examples, the addition of doped ceria significantly lowered the propensity of those reactions. The composites consisted of 50 vol. % ceria to provide an interpenetrating network of proton and electron (ceria in reducing atmosphere) conducting phases. The exposure test results are reproduced in FIG. 7. At the bottom of FIG. 7 is the X-ray pattern for $BaCe_{0.7}Eu_{0.3}O_{3-\partial}$ after exposure to syngas at 900° C. Of the two composites, composite 1 is stoichiometric $BaCe_{0.7}Eu_{0.3}O_{3-\partial}$ with 50 vol. % ceria and composite 2 is 4%-Ba-site deficient perovskite mixed with 50 vol. % ceria. It is clearly seen that a significant reduction in the amount of reaction product $BaCeO_3$ occurs with the composite. Peaks corresponding to the reaction product nearly disappear when the Ba-deficit version of the perovskite is used.

EXAMPLE 7

Figure 8:
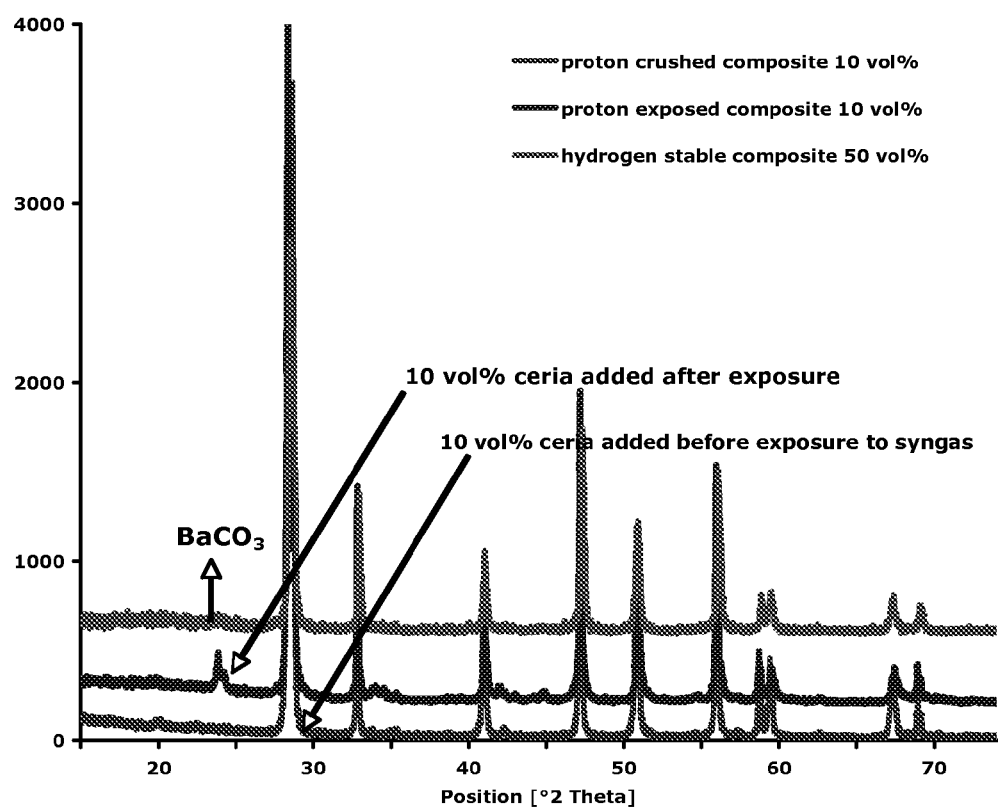
FIG. 8 is a graph of an X-ray analysis showing stability of stoichiometric composite perovskite materials (10 vol. % ceria) before and after syngas exposure compared to a Ba-deficit perovskite with 50 vol. % ceria.

As an electronic short will be detrimental to fuel cell electrolyte function, ceria was added in an amount below the percolation limit (10 vol. %) to a proton-conducting perovskite. At 10 vol. %, the ceria grains do not form a contiguous phase and hence the composite essentially functions as an ionic (proton) conducting electrolyte. FIG. 8 shows the x-ray diffraction pattern of the composite prior to syngas exposure (at the bottom), and the 10% ceria composite after exposure to syngas (both $CO_2$ and $H_2O$ present). The 50% composite with Ba-deficit perovskite is also shown (at the top) for comparison. Once again, compared to the baseline perovskite in FIG. 7, even 10 vol. % ceria addition gives a comparable stability as the 50 vol. % ceria addition. A combination of Ba-deficit perovskite and ceria addition at 10 vol. %, or higher, but below the percolation limit, is expected to nearly eliminate the stability issue of perovskite electrolyte in syngas fuel. This will eliminate the biggest hurdle in the use of $BaCeO_3$ type electrolyte in a practical fuel cell application.

Improved Fabrication

One of the well recognized challenges in the fabrication of $BaCeO_3$ based compositions is to find suitable powder processing and sintering conditions to achieve adequate density. At a minimum, the sintered body should have closed porosity to avoid direct gas diffusion that will affect fuel efficiency. One known approach to improve density and closed porosity involves various powder milling techniques to achieve the particle size distribution and powder surface area necessary to achieve a density higher than 94%. Scanning electron micrographs are shown in FIGS. 9A and 9B of $BaCeO_3$ sintered bars obtained using particle size distribution techniques. FIG. 9A shows the sintered single phase perovskite showing closed porosity at 200×. FIG. 9B shows the same sintered single phase perovskite at 1500×.

While the porosity appeared to consist of closed porosity, such a pore distribution is likely to make the material weaker and will give lower conductance for proton and oxygen ions. The biggest risk, however, is that a small amount of electronic conduction remains in composition in the temperature range above 600° C. that may cause proton or oxygen ions to "precipitate" in the pores by reacting with electrons transported through the material. This will result in gas pressure build up in the pores resulting in electrolyte rupture. This has been well documented in oxygen separation membrane electrolytes that show a small electronic conductivity when a large amount of pores are present.

In order to lower the porosity of the sintered material, a small amount (10 vol. % ceria) was added to the powder. This significantly improved the sinterability of the material as seen in FIGS. 10A and 10B. FIGS. 10A and 10B are scanning electron micrographs of sintered perovskite composite material with 10 vol. % ceria at 200× and 1000×, respectively. As the ceria addition also improves the stability of the electrolyte, this approach is a good option to improve density and stability. A more dense material permits the fabrication of thinner membranes and increased strength. A more stable material facilitates its practical use in syngas fuel applications, such as SOFC applications.

Cell Testing

Button cells were fabricated using two baseline compositions: 0.05 Eu-0.05 Yb doped and 0.1 Eu-0.1 Yb doped compositions. A total of 15 button cells were tested using both pressed discs (0.2 cm; 2000 microns) and tape cast discs (0.04 cm; 400 microns). Most of the cells showed open cell voltage (OCV) values ranging from 0.85 to 1.03 V at 800° C. In some cases the cement seal used was inadequate. More than 10 cells showed OCV values of 0.95 or higher confirming that these compositions are predominantly ionic conductors (proton and oxygen).

A tape case electrolyte (400 microns) of $BaCeO_3$ with 0.05 Eu and 0.05 Yb doping was tested. This batch also had 10 vol. % ceria to improve sinterability and stability.

Figure 11:
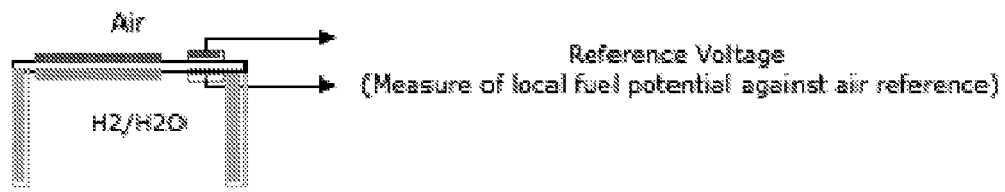
FIG. 11 is a schematic representation of a button cell showing main and reference electrodes.

FIG. 11 illustrates a schematic representation of a proton conducting ceramic membrane for fuel cell application containing reference electrodes. The use of reference electrodes also provides additional insights in the DC tests, in particular when comparing proton and oxygen conducting electrolytes. One benefit of a proton conducting electrolyte comes from the fact that the product water formation is on the air side and thus the driving potential is much flatter as a function of fuel utilization.

Figure 12:
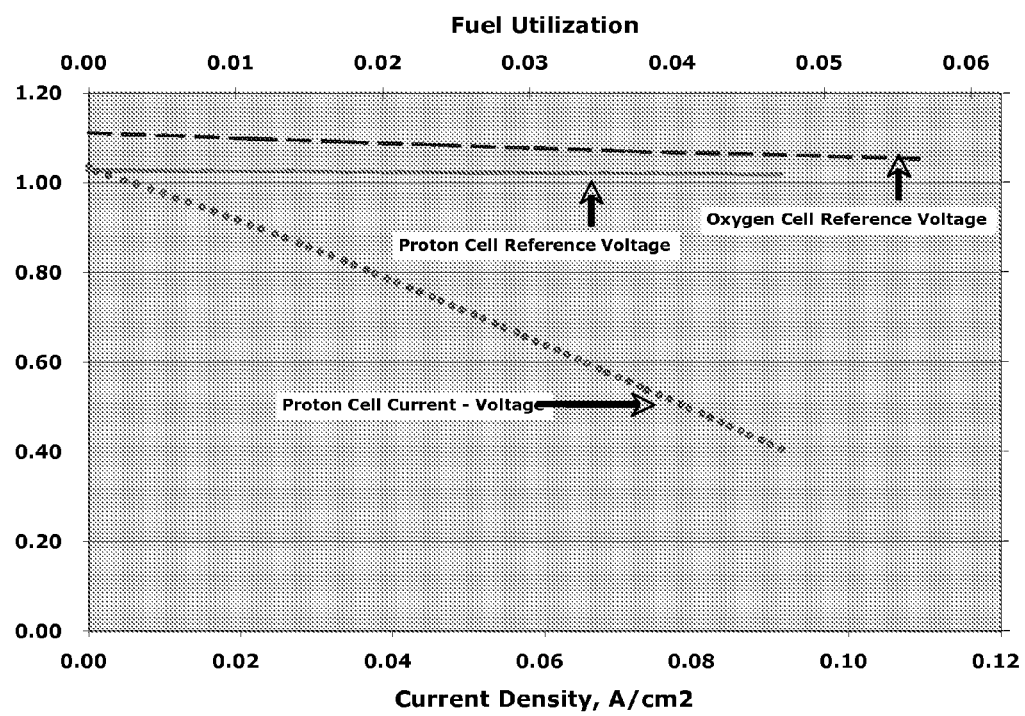
FIG. 12 is a button cell performance curve comparing the Nernst potential between oxygen and proton conducting electrolytes.

FIG. 12 shows the current-voltage performance of the proton cell that had a measured area specific resistance (ASR) of about 5.3 ohm-cm$^2$ as would be expected from the total AC low frequency intercept. The reference voltage measured during the sweep is also shown. A zirconia (oxygen conducting electrolyte) cell was also tested with identical electrode area, fuel composition ($H_2$-3% $H_2O$) and flow rate of 35 standard cubic centimeters per minute (sccm). The reference voltage from the oxygen cell is also shown for the same range of fuel utilization.

From a comparison of the reference voltage traces, at open circuit the proton OCV is lower than that of oxygen OCV. This is a confirmation of pure ionic conduction of zirconia electrolyte providing near theoretical Nernst potential. The lower OCV of the proton cell is an indication of the ionic transference $t_{ion}$ being less than one, in this case about 0.96. Because of $t_{ion}$ is less than 1, the true benefit of the proton cell is not manifest until the cell reaches much higher utilization. The driving potential in this case will cross over at about 10 to 15% fuel utilization. It is theoretically possible to achieve very high utilization at higher operating voltage with a proton cell.

As a function of utilization however, the driving potential of the oxygen cell drops more steeply than the proton cell. This confirms that the proton cell maintains a higher driving force. That is, there is no water dilution of fuel in a pure proton conductor, but in this case some dilution is expected from the oxygen ion conduction.

Finally while high efficiency operation is clearly possible with the proton cell, the cell resistance is preferably lowered by a factor of 10 to fully realize the benefits of proton cell in terms of cost/kW as well as specific weight and volume.

From the foregoing, doped $BaCeO_3$ is predominantly proton conducting, having a proton transference number of about 0.6 to 0.7 at 800° C., which will increase at lower temperatures. The overall ion transference number of doped $BaCeO_3$ is about 0.95. This indicates that the OCV is only slightly depressed and is still above 1 V with $H_2$-3% $H_2O$.

The addition of ceria improves stability of $BaCeO_3$ in syngas. This demonstrates the material is feasible in practical applications. Even 10 vol. % ceria addition significantly improves stability in powder exposure and shows no penalty in OCV. A small amount of Ba-site deficiency further reduces the amount of reaction product and enhances stability in syngas.

A small amount of ceria added to $BaCeO_3$ improves the sinterability of the ceramic by lowering the porosity and increasing the density. Higher density allows fabrication of thinner electrolytes that are stronger and pore-free.

Cell tests of the proton conducting ceramic membrane comprising $BaCeO_3$ and ceria demonstrated good open circuit voltage (>95% theoretical). They also maintained high driving potential at increasing utilization and will overtake the driving potential of the oxygen conducting zirconia electrolyte at >20% utilization. This leads to high efficiency operation of the cell.

While specific embodiments of the present invention have been illustrated and described, numerous modifications come to mind without significantly departing from the spirit of the invention, and the scope of protection is only limited by the scope of the accompanying claims.

The invention claimed is:

1. A method for producing a multi-phase ceramic composite material, the method comprising:
   forming a first powder of a proton conducting ceramic phase; and
   subsequently adding a preformed second powder of a secondary ceramic phase to the proton conducting ceramic phase in an amount below a percolation limit in the proton conducting ceramic phase and in an amount sufficient to improve thermodynamic stability of the proton conducting ceramic phase.

2. The method of claim 1, wherein the secondary ceramic phase is structurally and chemically identical to at least one product of a reaction between the proton conducting phase and at least one expected gas under operating conditions of a membrane fabricated using the material.

3. The method of claim 2, wherein the secondary ceramic phase has a form $Ce_{1-x}B_xO_{2-\epsilon}$, wherein B represents at least one element out of a plurality of elements, wherein the plurality of elements comprises yttrium and an element belonging to the Lanthanide series in the periodic table, and $\epsilon$ is an oxygen deficiency.

4. The method of claim 3, wherein $0 \leq x \leq 0.75$.

5. The method of claim 1, wherein the secondary ceramic phase has a form $Ce_{1-x}B_xO_{2-\epsilon}$, wherein B represents at least one element out of a plurality of elements, wherein the plurality of elements comprises yttrium and an element belonging to the Lanthanide series in the periodic table, and c is an oxygen deficiency.

6. The method of claim 5, wherein $0 \leq x \leq 0.75$.

7. The method of claim 1, wherein the proton conducting ceramic phase has a perovskite structure.

8. The method of claim 7, wherein the secondary phase comprises a ceria.

9. The method of claim 7, wherein the secondary phase comprises a doped ceria.

10. The method of claim 8, wherein the perovskite has a form $A_{1-x-\alpha}P_xB_{1-y}Q_yO_{3-\delta}$, wherein A is a bivalent cation selected from the group consisting of barium (Ba), strontium (Sr), calcium (Ca) and magnesium (Mg) and combinations thereof, P is an A-site dopant, which is a cation, B is a tetravalent cation selected from the group consisting of an element in Group IV of the period table, and an element in the lanthanide series of the periodic table, Q is a B-site dopant selected from the group consisting of an element in Group III of the period table, and an element in the lanthanide series of the periodic table, a is a non-stoichiometric A-site deficiency and $\delta$ is an oxygen deficiency.

11. The method of claim 10, wherein the A-site dopant is a cation selected from the group consisting essentially of Pr, Sm, Er and an element in the lanthanide series of the periodic table.

12. The material in accordance with claim 10, wherein $0 \leq \alpha \leq 0.1$.

13. The material in accordance with claim 10, wherein $0 \leq x \leq 0.5$.

14. The material in accordance with claim 10, wherein $0 \leq y \leq 0.3$.

15. The method of claim 1, wherein the proton conducting ceramic phase has a pyrochlore structure of $(A'_{2-\gamma}A''_{\gamma})_2(B_{2-\eta}R_{\eta})O_{7-\lambda}$ wherein A' is a trivalent cation, A" is a divalent cation, B is a tetravalent cation and R is a divalent cation.

16. The method of claim 15, wherein A" and R are identical cations.

17. The method of claim 15, wherein $0 \leq \gamma \leq 0.3$.

18. The method of claim 15, wherein $0 \leq \eta \leq 0.3$.

19. The method of claim 1, where the proton conducting ceramic phase is a complex perovskite.

20. The method of claim 19, wherein the complex perovskite has a structure of $A_2(B'_{1+\beta}B''_{1-\beta})O_{6-\lambda}$, wherein A is a divalent ion, B' is one of a trivalent ion and a tetravalent ion, and B" is a pentavalent ion.

21. The method of claim 20, wherein $0 \leq \beta \leq 0.3$.

22. The method of claim 20, wherein $0 \leq \phi \leq 0.2$.

23. The method of claim 19, wherein the complex perovskite has a structure $A_3(B'_{1+\phi}B''_{2-100})O_{9-\lambda}$, wherein A is a divalent ion, B' is one of a trivalent ion and a tetravalent ion, and B" is a pentavalent ion.

24. The method of claim 23, wherein $0 \leq \beta \leq 0.3$.

25. The material in accordance with claim 23, wherein $0 \leq \phi \leq 0.2$.

26. The method of claim 1, wherein the material is gas impermeable when sintered.

27. The method of claim 1, wherein adding the secondary ceramic phase further comprises adding the secondary ceramic phase in an amount sufficient to prevent the formation of carbonate when the material is in the presence of carbon dioxide.

28. The method of claim 1, wherein adding the secondary ceramic phase further comprises adding the secondary ceramic phase in an amount sufficient to prevent the formation of hydroxide when the material is in the presence of water.

29. The method of claim 1, wherein the proton conducting ceramic phase comprises a protonic conductivity greater than $1.0 \times 10^{-3}$ S/cm at an operating temperature.

30. A method for producing a multi-phase ceramic composite material, the method comprising:
forming a first powder of a proton conducting ceramic phase having a protonic conductivity greater than $1.0 \times 10^{-3}$ S/cm at an operating temperature; and
subsequently adding a preformed second powder of a secondary ceramic phase to the proton conducting ceramic phase in an amount below a percolation limit in the proton conducting ceramic phase and in an amount sufficient to improve thermodynamic stability of the proton conducting ceramic phase, and wherein the secondary ceramic phase has a form $Ce_{1-x}B_xO_{2-\epsilon}$, wherein B represents at least one element out of a plurality of elements, wherein the plurality of elements comprises of yttrium and an element belonging to the Lanthanide series in the periodic table, and c is an oxygen deficiency.

31. A method for producing a multi-phase ceramic composite material, the method comprising:
forming a first powder of a proton conducting ceramic phase having a protonic conductivity greater than $1.0 \times 10^{-3}$ S/cm at an operating temperature and wherein the proton conducting ceramic phase has a perovskite structure; and
subsequently adding a preformed second powder of a secondary ceramic phase to the proton conducting ceramic phase in an amount below a percolation limit in the proton conducting ceramic phase and in an amount sufficient to improve thermodynamic stability of the proton conducting ceramic phase, and wherein the secondary ceramic phase comprises a doped ceria.

* * * * *